Patented Apr. 26, 1938

2,115,490

UNITED STATES PATENT OFFICE 2,115,490

METHOD OF PURIFYING ROSIN

Irvin W. Humphrey, Wilmington, Del., assignor to Hercules Powder Company, Wilmington, Del., a corporation of Delaware No Drawing. Application July 27, 1936, Serial No. 92,846

9 Claims. (Cl. 87—2)

This invention relates to an improved method of purifying rosin.

Heretofore, several methods for the removal of visible and latent color bodies from rosin have been known, among them the treatment of a gasoline solution of rosin with furfural, aniline, phenol, liquid sulfur dioxide, etc., separation of the selective solvent containing the color bodies and low-grade rosin, and recovery from the gasoline solution of the purified rosin. However, certain of the darker grades of rosin have not responded to such treatment to as great an extent as is desirable, so that, while an improvement in color grade by such treatment results, such treatment will not bring certain of the very dark rosins up to the very light color grades.

The method in accordance with my improved process enables me to refine very dark color grades of rosin to the very palest color grades.

The method in accordance with my invention consists broadly in the treating of a solution of rosin in a water-immiscible solvent therefor with a silicofluoride (including hydrogen silicofluoride, or hydrofluosilicic acid) followed by a selective color body removal treatment of the rosin-solvent solution. Such combined refining treatment of rosin accomplishes a refining action not attainable by either refining treatment alone.

While the greatest advantage of my improved process of refining rosin lies in the treatment of the darker color grades of rosin, either wood or gum, I may use the same to advantage upon any color grade of rosin to be refined.

In practicing the method in accordance with my invention, the rosin solvent used may be a water-immiscible solvent for the rosin, for example, mineral spirits, gasoline, butane, petroleum ether, pentane, hexane, etc. The silicofluoride employed in my refining treatment may be a water-soluble silicofluoride, e. g., silicofluorides of sodium or potassium or ammonium, aniline fluosilicate, toluidine fluosilicate, or other organic fluosilicates, a sparingly water-soluble silicofluoride, e. g., calcium or magnesium silicofluoride, titanium-potassium silicofluoride, or a slightly soluble silicofluoride, e. g., lead silicofluoride. In the case of the use of silicofluorides of little solubility in water, I prefer to use the same as a suspension in water, so that during the treatment in accordance with my invention the water is continuously saturated with the silicofluoride employed. Also, in the case of use of silicofluorides slightly soluble in water, but soluble in dilute alcohol, I may use a dilute alcohol solution thereof in the treatment of the rosin solvent solution, in order to facilitate contact of the rosin with the silicofluoride.

I may carry out the silicofluoride treatment of the rosin in a solvent at room temperature or at an elevated temperature, and I may employ vigorous agitation during the treatment to promote thoroughness of contact of the silicofluoride with the rosin and thus shorten the time of treatment necessary to attain the refining action desirable. In case of the use of a suspension of a slightly-soluble silicofluoride, I may, after treatment of the rosin therewith, filter the solution and suspension to remove the suspended silicofluoride, and then wash the rosin solution with water.

After my refining treatment with silicofluoride, the rosin solution is subjected to a second refining treatment with any of the usual color body selective reagents, e. g., furfural, phenol, resorcinol, or other selective, immiscible color body solvent or mixtures thereof which do not interact one with another, or by fuller's earth, activated carbon, etc. The rosin recovered from the rosin solvent after silicofluoride or combined refining treatment may be further purified by crystallization, heat treatment, distillation under reduced pressure, fractionation, partial hydrogenation, or any combination thereof, since the real effect of the silicofluoride treatment in my process is to place the dark rosin in such a state that it is readily refinable by the subsequent selective reagent or other treatment, whereas without such preliminary treatment, it is resistant thereto.

As an example of the process in accordance with my invention, a 20% gasoline solution of gum D rosin was washed thoroughly by agitation with one-half its volume of a 1% aqueous solution of sodium silicofluoride, the sodium silicofluoride being partly in solution and partly in suspension, the two layers of liquid allowed to separate, the gasoline solution of rosin decanted. This gasoline solution of rosin was then given three successive washes, each amounting to one-fifth of the rosin solution, with furfural at 0° C., the furfural solution allowed to settle, the gasoline solution of the purified rosin decanted, the gasoline evaporated, and the rosin recovered. The recovered rosin graded M in color, and on heat-bleaching formed a rosin grading X in color.

As an additional example of the process in accordance with my invention, a 50% solution of gum D rosin in gasoline, containing 65 g. of rosin, was given two washes with an aqueous solution of sodium silicofluoride containing 0.3 g. of sodiumsilicofluoride per wash, then the rosin was subjected to the usual furfural refining treatment. The rosin recovered was WG in color, and heat-bleached to better than X grade on heating to about 300° C. for 10 minutes. When the sodium silicofluoride treatment was omitted, the furfural-refined rosin was G in color and heat-bleached only to a WW grade. Similarly, a gum D rosin, which refined to an N grade with furfural alone, was refined to an X grade when the preliminary silicofluoride treatment was given, and gum E rosin, refinable to M grade by furfural only, refined to a WG grade by inclusion of the silicofluoride treatment.

To illustrate the cooperation of the two treatments and the unexpected advantages resulting from such combination of treatments, another portion of the gasoline solution of gum D rosin used in the above treatment was subjected to the silicofluoride wash alone, and the rosin recovered from the gasoline layer. The recovered rosin graded D in color, and no appreciable refining action had occurred.

Rosin, subjected to the silicofluoride treatment alone, when recovered from the solvent is generally found to have undergone no appreciable refining in color grade, but is found to be more amenable to the action of subsequent refining.

I do not limit myself to any particular apparatus for the carrying out of my process, nor to the use of any particular temperature in such treatment, nor to the use of any particular concentrations of the reactants, it being obvious that different grades of rosin will require various modifications of the same. I may also apply my improved refining treatment to other resin derivatives, such as rosin esters, with advantage.

What I claim and desire to protect by Letters Patent is:

1. Method of purifying rosin which includes treating rosin in solution in a hydrocarbon solvent therefor, which hydrocarbon solvent is substantially immiscible with a color body selective solvent, with an aqueous solution of silicofluoride, thus rendering the rosin readily refinable by subsequent treatment, removing said silicofluoride solution from the rosin solution, treating the rosin solution with a selective color body solvent substantially immiscible with the rosin solvent, removing said color body solvent and color bodies from the rosin solution, removing solvent from the rosin solution for the recovery of purified rosin.

2. Method of purifying rosin which includes treating rosin in solution in a hydrocarbon solvent therefor, which hydrocarbon is substantially immiscible with a color body selective solvent, with an aqueous solution of a silicofluoride, thus rendering the rosin readily refinable by subsequent treatment, removing said silicofluoride solution from the rosin solution, treating the rosin solution with furfural, removing furfural and color bodies from the rosin solution, removing solvent from the rosin solution for recovery of purified rosin.

3. Method of purifying rosin which includes treating rosin in gasoline solution with an aqueous solution of sodium silicofluoride, separating said silicofluoride solution from the rosin solution, thus rendering the rosin readily refinable by subsequent treatment, treating the rosin solution with furfural, removing furfural and color bodies from the rosin solution for recovery of purified rosin.

4. Method of purifying rosin in solution in a water-immiscible solvent therefor which includes treating said rosin solution with an aqueous medium containing a silicofluoride which is at least appreciably soluble in said aqueous medium, separating the rosin solution from the said aqueous medium, thus rendering the rosin readily refinable by subsequent treatment, treating the rosin solution with a selective color body removing agent, and recovering purified rosin.

5. Method of purifying rosin in solution in a water-immiscible solvent therefor which includes treating said rosin solution with an aqueous solution of a silicofluoride, separating said silicofluoride from the rosin solution thus rendering the rosin readily refinable by subsequent treatment, treating the rosin solution with a selective color body removing agent, and recovering purified rosin.

6. Method of purifying rosin in solution in a water-immiscible solvent therefor which includes treating said rosin solution with a suspension solution of a water-soluble silicofluoride, separating the rosin solution from the said suspension solution of silicofluoride, thus rendering the rosin readily refinable by subsequent treatment, treating the rosin solution with a selective color body removing agent, and recovering purified rosin.

7. Method of purifying rosin in solution in a water-immiscible, aliphatic, hydrocarbon solvent therefor, which includes treating said rosin solution with an aqueous medium containing a silicofluoride which is at least appreciably soluble in said aqueous medium, separating the rosin solution from the said aqueous medium, thus rendering the rosin readily refinable by subsequent treatment, treating the rosin solution with a selective color body removing agent and recovering purified rosin.

8. Method of purifying rosin in solution in a water-immiscible, aliphatic, hydrocarbon solvent therefor, which includes treating said rosin solution with an aqueous solution of a silicofluoride, separating said silicofluoride solution from the rosin solution thus rendering the rosin readily refinable by subsequent treatment, treating the rosin solution with a selective color body removing agent and recovering purified rosin.

9. Method of purifying rosin in solution in a water-immiscible, aliphatic, hydrocarbon solvent therefor, which includes treating said rosin solution with a suspension solution of a water-soluble silicofluoride, separating the rosin solution from the said suspension solution of silicofluoride, thus rendering the rosin readily refinable by subsequent treatment, treating the rosin solution with a selective color body removing agent and recovering purified rosin.

IRVIN W. HUMPHREY.